(12) United States Patent
Carter

(10) Patent No.: US 7,606,817 B2
(45) Date of Patent: Oct. 20, 2009

(54) PRIMENET DATA MANAGEMENT SYSTEM

(75) Inventor: Joe K. Carter, Palo Alto, CA (US)

(73) Assignee: Entity Labs, Ltd., Palo Alto, CA (US)

( * ) Notice: Subject to any disclaimer, the term of this patent is extended or adjusted under 35 U.S.C. 154(b) by 173 days.

(21) Appl. No.: 11/461,981

(22) Filed: Aug. 2, 2006

(65) Prior Publication Data

US 2008/0033987 A1  Feb. 7, 2008

(51) Int. Cl.
*G06F 7/00* (2006.01)
*G06F 17/30* (2006.01)

(52) U.S. Cl. ........................... 707/101; 707/102
(58) Field of Classification Search ................ None
See application file for complete search history.

(56) References Cited

U.S. PATENT DOCUMENTS

| | | | |
|---|---|---|---|
| 5,454,101 A * | 9/1995 | Mackay et al. ............... 707/3 |
| 5,625,813 A * | 4/1997 | Venn ............................. 707/2 |
| 6,055,537 A | 4/2000 | LeTourneau |
| 6,510,433 B1 * | 1/2003 | Sharp et al. ................ 707/100 |
| 2001/0051946 A1 * | 12/2001 | Nishikawa ................. 707/100 |
| 2003/0120642 A1 * | 6/2003 | Egilsson et al. ............. 707/3 |
| 2006/0176306 A1 * | 8/2006 | Nagaraj et al. ............ 345/440 |
| 2007/0112818 A1 * | 5/2007 | Sastry ........................ 707/101 |
| 2008/0005208 A1 * | 1/2008 | Vaswani et al. ............ 707/206 |

OTHER PUBLICATIONS

Hoffer et al., "Modern Database Management", Prentice Hall, 7th edition, Apr. 6, 2004, pp. 256.*
Wu et al., "A Prime Number Labeling Scheme for dynamic Ordered XML Trees", Proceedings of the 20th International Conference on Data Engineering, Apr. 2004, 13 pages.*
PCT International Search Report and Written Opinion, PCT/US2007/074431, Jul. 18, 2008.

* cited by examiner

*Primary Examiner*—John R. Cottingham
*Assistant Examiner*—James E Richardson
(74) *Attorney, Agent, or Firm*—Fenwick & West LLP

(57) ABSTRACT

A data structure includes a plurality of records that are mapped to the nodes of a primenet structure, where each node is uniquely identified by an integer node identifier. In the primenet structure, each node is associated with an integer node identifier and an information item. Each particular node having a node identifier N is related to one or more other nodes that have a node identifier of which the Nth prime number is a factor. Information items in any complex problem domain can be stored in this type of data structure, and management algorithms can then be used to reveal relationships among the items in the data structure.

44 Claims, 4 Drawing Sheets

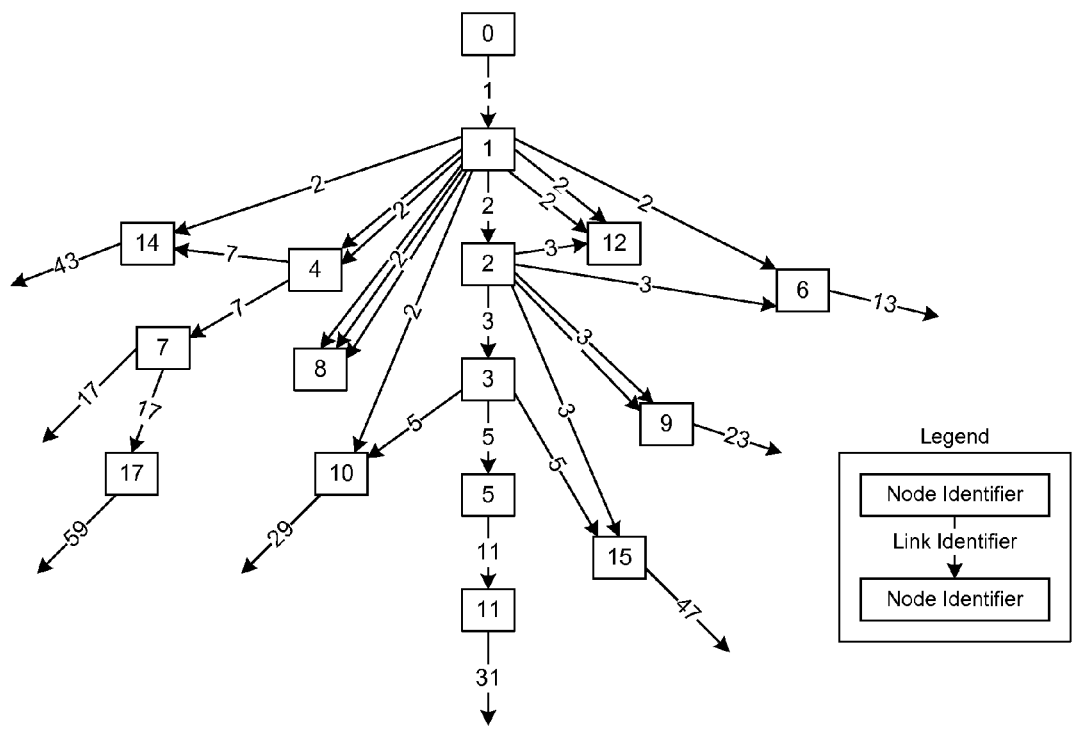
FIG. 1
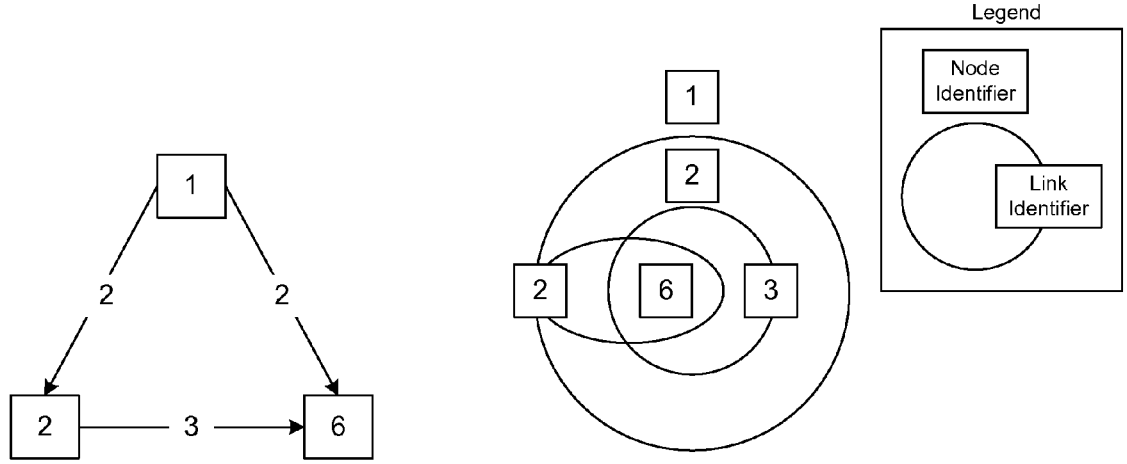
FIG. 2A  FIG. 2B

PRIMENET DATA MANAGEMENT SYSTEM

BACKGROUND

This invention relates generally to information technology and in particular to modeling information from a complex problem domain to a data representation and using the data representation to obtain knowledge about the problem domain.

One of the fundamental problems with the current state of the art in information technology is the requirement that complex knowledge be shoehorned into simplistic data structures, such as tables, lists, graphs, or trees. But the inherent complexity of a problem does not go away when the problem is forced into a simple data representations; it simply spills over into the algorithms that are used to manipulate the data representation. For example, storing data from a complex domain into a relational table structure often requires multiple tables, duplicate entries in the tables, and a large body of rules that maintain the consistency, integrity and relationships of the data. Accordingly, reducing the complexity of a data representation itself merely results in an increased complexity in the algorithms used to manage that the data representation. Because there is no systematic relationship between the identities in a relational model in existing data structures, so there has to be a very complex set of rules for referential integrity as well as complex rules for queries, joins, and other operations on the data structure.

To simplify the algorithms used to process data structures, what is needed is a way to capture fully the complexity of a real problem domain in a data representation. In this way, the algorithms used to process the data can be simplified, making the stored information more usable to solve complex problems in a particular domain.

SUMMARY OF THE INVENTION

To address this complexity issue, a data management system is described that is capable of capturing the full complexity of a problem domain in the data representation itself. The data management system simplifies the algorithms used to access and manipulate the data held in the system. Simplifying the data management and access algorithms makes implementing problem solutions in any given problem domain much easier—and in many cases, feasible, where implementing a solution using conventional data representations previously was not.

The data representation applies the concept of a primenet, which is a complex data representation that stores individual records and relates those records by maintaining certain relationships between prime numbers and integers associated with each record. In a primenet, each node of the structure is associated with a particular item of data and uniquely identified by an integer N, called the node identifier. Each node may include one or more directed links to certain other nodes. For a node identified by the node identifier N, the links that emanate from that node are uniquely identified by the Nth prime number P; hence, the node identifiers can also be understood as prime number indices, in that any given N indexes the Nth prime P. The value P can be used as a link identifier of its link from node N. The value of any node identifier N is calculated as the product of the link identifiers $P_1$ through $P_X$ for all of the directed links that point into that node. The link identifiers in the structure can have the value of 1 or any prime number up to some designated maximum value, and a node identifier can have the value of 0 or any integer product of the collection of prime numbers used for link identifiers that are directed at the node identifier's node.

To further elaborate, one embodiment of a primenet data representation includes a plurality of records that are associated with an information item and are uniquely defined by a collection of prime numbers, the product of which is a unique integer stored in association with the record. (For simplicity, it can be said that an identifier is stored "in" a record, which is understood to include storing the identifier physically in the record as well as storing it in association with, but physically apart from the record, or any other appropriate storage relationship). Because each of the records is associated with a unique integer product of a collection of prime numbers, the records can be directedly related to one or more other records according to the primenet structure. In this way, the primenet serves as a blank template, onto which the information items in a problem domain can be mapped according to whatever relationships in fact exist in the data according to a model of a problem domain. Because each node can have a large number of inbound and outbound links, the number and complexity of relationships between nodes can be scaled far beyond the capabilities of conventional data structures. This allows a primenet data representation to model almost any complex set of relationships in a problem domain, and capture the complex relationships and associations that may exist in the data. The primenet data structure can then be used to extract additional information and identify other inherent relationships for the items in the data structure—relationships that need not be known beforehand.

In one embodiment, a primenet data representation includes a plurality of records each associated with an item, which may be, without limitation, any kind of object, thing, or concept in any problem domain. A simple example is that an item can be a person, and some number of records can be associated with the person, such as name, birth date, and so forth. Each record in the data representation is also associated with a unique node in a primenet structure by a unique integer node identifier, N that is stored in the record. If an item in the problem domain has a directed relationship to one or more other items in the domain, the record will also be associated with one or more outbound links. All of the outbound links for a particular node have a common unique link identifier P, where P is the Nth prime number (or 1, if the node identifier is 0). For each record, the node identifier N is the product of the inbound link identifiers; that is, the link identifiers for the directed links that point into that node from other nodes. These inbound and outbound links represent directed relationships between the items in the problem domain.

A number of data structure management modules are provided for managing the primenet data architecture as well as revealing relationships among the items in the data structure. In various embodiments of the invention, the management modules include modules for adding or deleting information items in particular locations in the primenet, adding or deleting the relationship between items in the data structure, searching for ancestral or descendant relationships for an item in the data structure, and identifying the relationship between any two items in the structure. These are just a few examples of the management modules that can be used with the primenet data architecture, as the structure enables many useful processes based on its model of the problem domain.

Accordingly, this primenet data structure has all the necessary richness and variety among its many links and nodes to form a rigorously well-defined structure that is isomorphic to the data of most problem domains, regardless of their complexity. Unlike previously used data structures and models, the primenet data structure is not inherently regular and repetitive. It contains an unbounded variety of substructures, one of which may match the natural structure of a problem domain. Substructures of the primenet structure can even be used to emulate conventional data structures, such as table and tree structures, or they may form a completely new structure tailored to a specific problem domain.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 1 is a diagram showing the relationships of a basic primenet structure.

FIGS. 2A and B are alternative representations of portions of an example primenet structure.

Figure 3A:
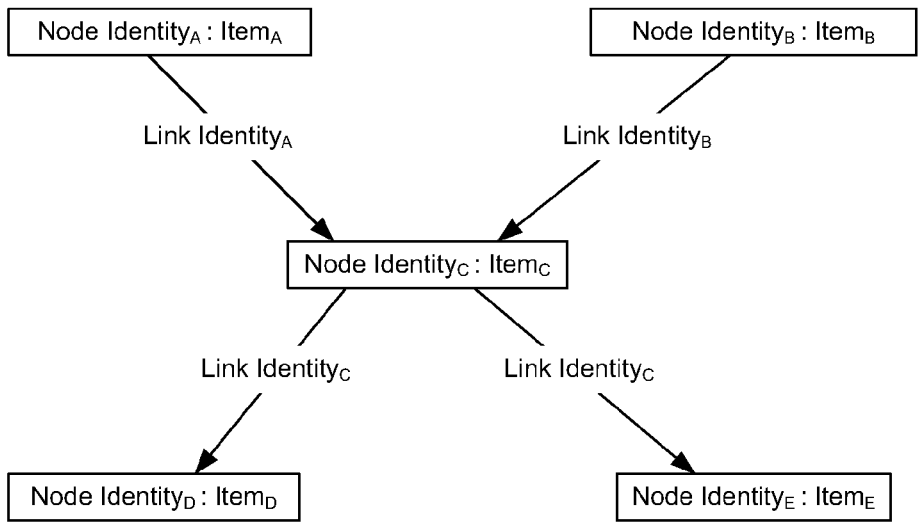
FIG. 3A is a simple example of a data structure in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Primenet Mathematics

The data structures described herein correspond to various instances of a primenet structure. A primenet is a complex computer-implemented data structure, akin to a directed graph that is formed in part by linking nodes of the structure using certain relationships between integers and prime numbers. Each node in the primenet is associated with a node identifier, which is an integer that uniquely identifies the node. Each node may include one or more outbound links from that node to another node; that is, a node may be the source of a number of links that are directed towards other nodes. The outbound links from a node having a node identifier N are each identified by a link identifier $P_N$, where $P_N$ is the Nth prime number (where the number 2 is the 1st prime number). The nodes in the primenet are then linked so that where a node having node identifier N is linked to another node having node identifier M with a link having link identifier $P_N$, then $P_N$ is a prime factor of M, where $P_N$ is the Nth prime number. Accordingly, some nodes may have no outbound links. For example, in a system where the largest link identifier allowed is the Nth prime, any node having a node identifier greater than N would have no outgoing links. In addition, the primenet structure may also include a node having a node identifier 0 with a link identifier of 1.

As used herein, a node is associated with its outbound links, so that a node having the node identifier N also has a link identifier $P_N$, where $P_N$ is the Nth prime number. For simplicity, the following terminology is used:

A node associated with node identifier N may be called "node N".

A link associated with link identifier P may be called "link P". (In addition, the node with node identifier of 0 has a link identifier of 1.)

The Nth prime may be called $P_N$, which is the prime number identifier of node N.

In this way, a node may be uniquely identified by a prime number identifier, which is the same as the link identifier of each of the outbound links from that node. The node identifier and link identifier for a node are thus related, and because of their uniqueness either one can be determined from the other. This relationship between the identifiers for nodes and links is one of the features that enable the primenet to capture fully any arbitrary relationship in the data of a problem domain while enforcing consistency and integrity on the data.

FIG. 1 is a conceptual diagram that illustrates the relationship of a portion of the nodes according in a primenet structure. To avoid clutter, most occurrences of the common link identifier 1 and links associated with it are omitted from FIG. 1. Although FIG. 1 is presented conceptually, an actual implementation of a primenet data representation in a computer system may have a different physical representation given the physical structure of computer memory. In addition, the data records associated with the various nodes are not shown, to avoid obscuring the underlying structure. The primenet structure may theoretically extend outward without bound, but in practical computing environments there will typically be an upper bound for P or some other size restriction on the structure (e.g., a limit on the number of nodes, links, total data size, or some other appropriate measure). Where the primenet is limited in size, some nodes may not have outbound directed links.

The relationships between the nodes are thus defined according to the relationships between the node identifiers and the link identifiers. This identifier assignment model can be contrasted with conventional data structures, such as tables, where unique numerical identifiers are used but the identifiers of related data elements bear no particular logical or mathematical relationship that can be used to manipulate the data elements. Each node has an inbound link from any other nodes whose link identifiers are one of the prime factors of the node's node identifier. For example, the node with the node identifier 15 ("node 15") has inbound links from node 2 and node 3 because the prime factors of its node identifier 15, are 3 (which is the 2nd prime) and 5 (which is the 3rd prime).

A given node may also have outbound links to each of the other nodes whose node identifiers are multiples of the given node's link identifier. For example, node 3 has outbound links to nodes 5, 10, and 15. This is because the 3rd prime number is 5, so the link identifier from node 3 is 5, which is a factor of the node identifiers for nodes 5, 10, and 15.

The term "primordination" is introduced herein to describe the directed relationship of the links between the nodes in the primenet. Primordination is the relationship between an integer N and another integer M, where the Nth prime number P ($P_N$) is a factor of M. According to this identifier assignment rule, node N is said to "primordinate" node M. The nodes in the collection of nodes that primordinate a given node are thus called the "primordinates" of the given node. For example, if there exists a node S that is related to nodes N, M, and O, then S is equal to the product of the Nth, Mth, and Oth primes (i.e., $S=P_N P_M P_O$). Thus, any node whose outbound link identifier is a prime factor of another node's node identifier thus primordinates that other node.

The process of primordination can be further explained with reference to FIG. 2A, which illustrates a portion of the primenet. For this illustration and in the remainder of this document, a node having node identifier N will be referred to as node N. In this portion of the primenet, node 2 has an inbound link from node 1, and node 6 has inbound links from node 1 and node 2. This relationship is based on the rules of primordination. For example 2 is the 1st prime number, which means that node 1 has a link identifier of 2, which is a prime factor (the only prime factor in this case) of node 2. Therefore, node 1 primordinates node 2. Moreover, since 3 is the 2nd prime, and because 2 and 3 are the prime factors of 6, then node 1 and node 2 are the primordinates of node 6. The physical records in the primenet data structure can be thus related to other records accordingly.

The links in the primenet can represent any kind of directed relationship in a problem domain. One kind of directed relationship is causality, where the node is caused by or results from the nodes that correspond to its primordinates. Another kind of relationship is membership, where the node associated with a prime number is a member of each class defined by the nodes associated with its primordinates. Causality and membership are just two examples of the types of relationships that can be modeled using the links in a primenet. The directed relationship between a prime number and its primordinates may represent any directed way in which two items in a problem domain can be related to each other. Moreover, different links in a single primenet may represent different types of relationships, creating a hybrid linked structure. There is no fundamental requirement that each link indicate the same type of relationship between two nodes; the semantics of the relationship are determined by the application developer who uses the primenet for a given application.

FIG. 2B illustrates an alternate representation of the portion of the primenet shown in FIG. 2A, where the relationships between the nodes are illustrated as memberships of a group in an adaptation of a Venn diagram format. This kind of representation may be appropriate where the links represent that one node is an element of another node. It can be appreciated that, logically, the structures of FIG. 2A and FIG. 2B are identical with respect to the primenet structure and the rules behind primordination. For example, the representation of FIG. 2A may be used to indicate that node 6 is caused by nodes 1 and 2 in combination, and node 2 is caused by node 1 alone. Correspondingly, FIG. 2B may indicate that node 6 is a member of node 1 and node 2 only, while node 2 is a member of 1. A concrete example of the relationships represented in FIGS. 2A and 2B is the relationships between a day, a month and year. A given day is a member of a month and a year while the month is a member of the year.

However represented, the relationships modeled using the primenet structure may have any desired significance based on the model that a designer of a particular data structure creates. Moreover, the different links within a primenet may have differing significances. For example, the model shown in FIGS. 2A and B may indicate both that node 6 is caused by node 1 and that node 6 is caused by node 2, which is a member of node 1.

Mapping the Problem Domain to the Primenet Representation

Creating a model for a problem domain is accomplished by mapping the entities or information items in the domain along with their relationships. Each concept, entity, or thing in the domain, called an information item, is assigned a unique integer node identifier that corresponds to a node in the primenet structure. The node identifiers are assigned in such a way that the links between the nodes in the primenet correspond to the relationships (e.g., causality, membership, is-a, has-a, parent/child, class/subclass, etc.) between the information items in the problem domain.

If the fundamental relationship between entities in a domain is the relationship of membership, then the membership function by which information item A is an element of information item B is implemented by the data management operations by which the node assigned to A is primordinated by the node assigned to B. Similarly, if the fundamental relationship is causality, then the causal relationship by which information item A is caused by item B are likewise implemented by the data management operations by which the node assigned to A is primordinated by the node assigned to B. Whatever the fundamental relationship between the information items might be for two items in a given problem domain, that relationship can be mapped to the logical relationship of primordination, which in turn has an implementation in the computer system via the primordination assignment rules. It is also possible to use primordination itself as the fundamental relationship in a problem domain, where primordination becomes a generic relationship between any two items.

Figure 3B:
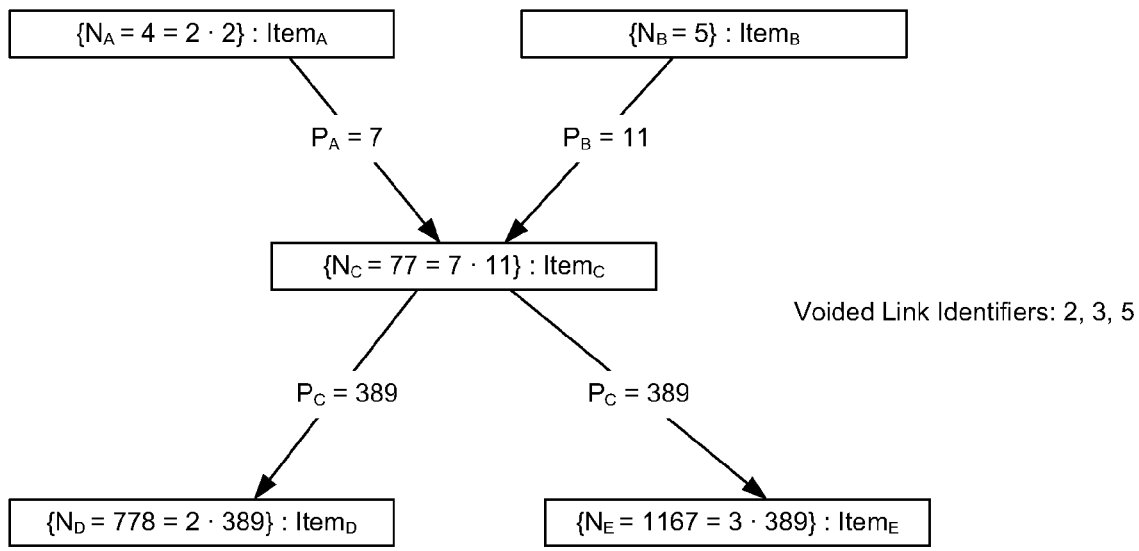
FIG. 3B is an example of an implementation of the data structure of FIG. 3A showing the relationships among the information items in the data structure.

FIGS. 3A and B illustrate the schema of a primenet data representation in which information items A through E have been stored in a computer memory according to a primenet structure. FIG. 3B illustrates the primordination relationships that interrelate the items in this example domain. Each node in the primenet structure has an information item associated with a node identifier. As shown in FIG. 3A, item C is primordinated by items A and B, and items D and E are each primordinated by item C. As shown in FIG. 3B, item C is primordinated by items A and B because item C's node identifier, 77, factors to 7 and 11, the link identifiers of items A and B, respectively. Moreover, item C primordinates items D and E because its link identifier 389 is a factor of each of those item's node identifiers, 778 and 1167, respectively. It is noted that these direct relationships with item C create indirect relationships between items D and E and items A and B.

Concept Management in a Primenet

In a primenet data representation, a node that has no inbound links is called a root node. The root nodes in a primenet substructure may be understood as being equivalent to an axiom in theory, as they do not depend on, or derive relationships from, other nodes. The root nodes are thus representative of predefined or a priori concepts from which all other concepts are built. In a tabular data structure, for example, each row and column is undefined, and the cells in the table are defined according to the rows and columns. In a simple primenet, such as illustrated in FIG. 1, there is only one undefined node—the node whose node identity is 0. But in real world problem domains, there will typically be many root concepts. Accordingly it will usually be desirable to create additional root nodes in the primenet. This is accomplished, in one embodiment, by artificially creating one or more "voids" in the primenet.

A void is a null link in the primenet structure. Root nodes can be implemented by declaring each of the link identifiers (i.e., prime number factors) of a node identifier to be voids. Once a prime number link identifier has been declared to be a void, relationships are not allowed through the link identified by that prime number. Essentially, a root node is not allowed to be related upwardly by any other nodes in the primenet.

Another way of expressing this is to say that root nodes do not have a dependency relationship (e.g., membership, causality, etc.) upon other nodes.

Every node in a primenet structure has a different collection of inbound links. In addition to being used for creating root nodes, voids can used to create a collection of nodes that effectively have duplicate inbound links. Voiding a link identifier creates two or more nodes that have the same collection of non-voided, active links. These nodes retain their unique node identities because the link identifiers of the voided links are still used as factors in determining the node identifiers. The use of voids to model a problem domain in which multiple nodes have the same collection of active inbound links is illustrated in the example data structure shown in FIGS. 4A and B.

Figure 4A:
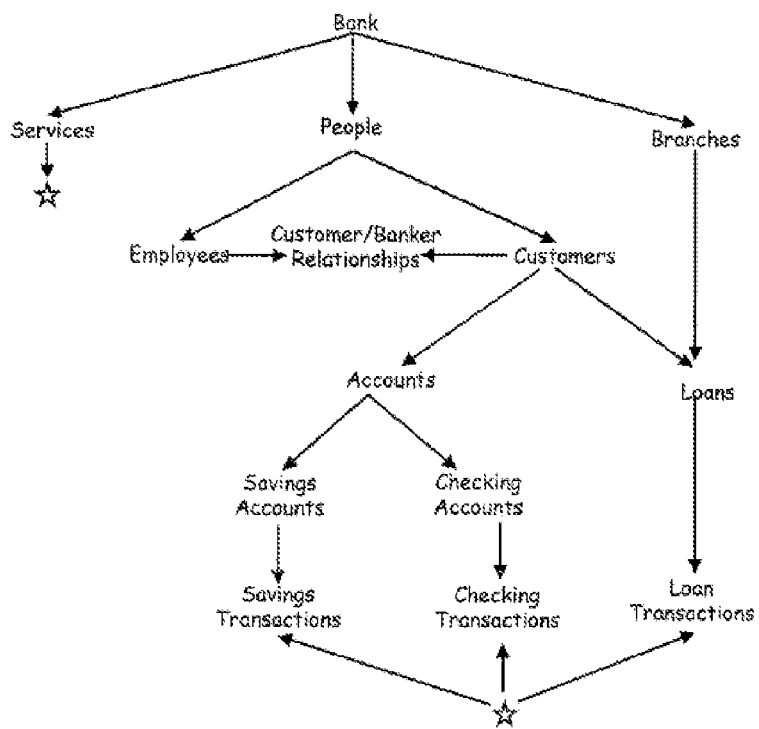
FIG. 4A is a diagrammatic representation of the primenet data structure applied to a particular problem domain, an example banking institution.
Figure 4B:
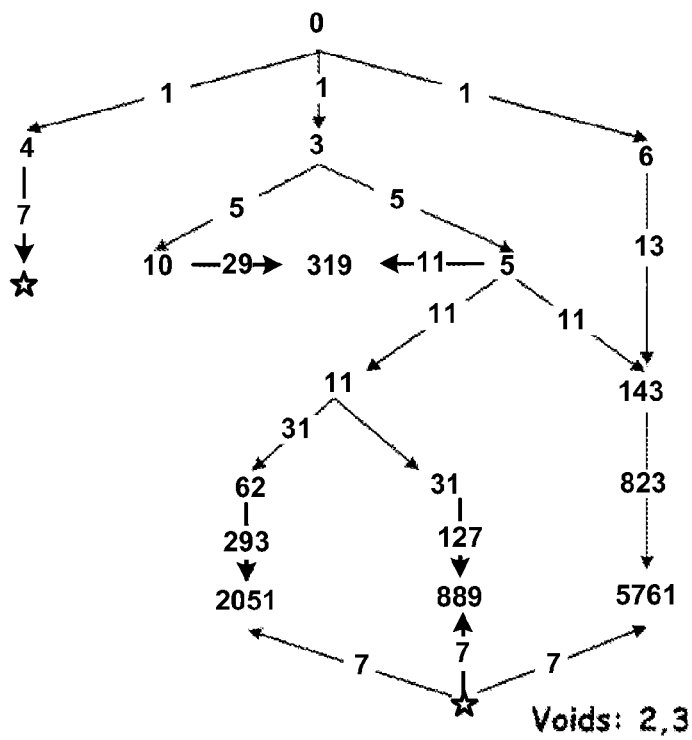
FIG. 4B illustrates the relationships among the information items in the data structure of FIG. 4A, in accordance with an embodiment of the invention.

FIG. 4A is an example of how information items in a banking institution problem domain can be mapped to the primenet structure, where the corresponding node and link identifiers are shown in FIG. 4B. In this data structure, the prime numbers 2 and 3 have been declared to be voided link identifiers. The voids allow multiple items to be primordinated directly and completely by the same item or items, a situation that never occurs in a native primenet without voids. The root nodes associated with the voids links 2 and 3 are not illustrated in FIG. 4B, as they have no independent meaning in the problem domain modeled in FIG. 4A except to allow multiple items with the same definition.

For example, the information items Customers and Employees in FIG. 4A are each associated with the item People, because Customers and Employees are both types of People in the banking domain. In FIG. 4B, it can be seen that both Customers and Employees are related to People, by link identifier 5; therefore the prime factors of the node identifiers for Customers and Employees should be 5. But the node identifiers of Customers and Employees cannot be the same, since the nodes in the data structure represent different things.

In this example, Customers have the node identifier 5 and link identifier 11 (because 11 is the 5th prime number), and Employees have the node identifier 10 (or 5·2) and the link identifier 29 (because 29 is the 10th prime number). The void of link identifier 2 thus allows distinguishing between two information items—Customers and Employees—that have the same active, non-voided inbound links. Alternatively, the voided link identifier 2 can be thought of as an indeterminate link, since it is known that Employees are different than Customers but there are no specific links to distinguish them.

In practical applications, a link identifier need not be physically assigned to a particular record if no other records are related under that record. This is because a record's link identifier is useful because of the mathematical relationship to the node identifiers of the other records related below it. But if there are no records related below that record, its link identifier may not serve any other purpose. Since the values of the unique prime number link identifiers can grow very fast, it may be advantageous for a computer to avoid computing and storing a link identifier for the record. Even if a computer does not store a unique prime number link identifier for a record physically, however, the record may still be considered to have such a prime number identifier associated therewith.

In one embodiment, a node may be split into two nodes, each having its own node identifier if a single node identifier would make the node's link identifier too large (e.g., a link identifier with a value greater than the system's declared maximum for link identifiers because of a node having a large number of inbound links). When that happens, the system can either increase upper bound on the maximum prime number, which negatively impacts performance, or the system can split the node into two or more separate nodes and attempt to keep them synchronized using appropriate algorithms. This presents a tradeoff between performance and algorithmic complexity.

To split a group of nodes (i.e., as defined by the same set of non-voided links), the application engineer can create a separate data structure to track the relationship between the split group, using the new data structure to keep the items in the split nodes synchronized. One approach to managing a split group is to create a new primenet structure in which every node is a root node. To do this, it is necessary to create enough voids to ensure that each node only has voided inbound links. If every prime less than or equal to N is voided, then every prime between N and P inclusive will be a root node when P equals the Nth prime. If every node in a primenet structure is a root node, then no changes in any node have an effect on any other node. The node identifiers are therefore absolute identifiers that never change as long as no link identifier exceeds P. Once an absolute identifier is established for a node, it is possible to set up two (or more) relative identities in other primenet structures and keep track of them via the absolute identifier that never changes. This technique may allow primenet systems to be scaled gracefully.

Software Architecture

Figure 5:
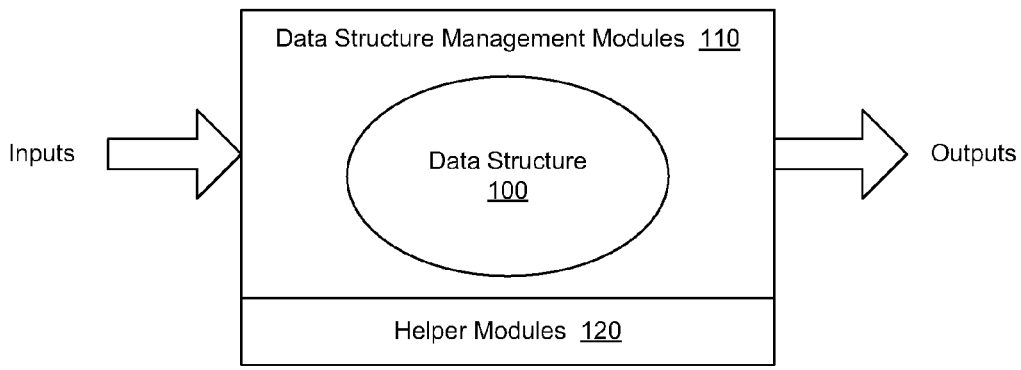
FIG. 5 is a schematic diagram of an architecture for using the data structure, according to an embodiment of the invention.

FIG. 5 illustrates one embodiment of a software architecture for designing and using embodiments of the data structures described herein. The architecture comprises a primenet data structure 100, as described herein. A set of data structure management modules 110 are also included for designing and making any desired changes to the data structure 100, as well as for extracting information from the data structure 100 once it is constructed. The management modules 110 may comprise computer code implementing one or more of the corresponding management algorithms, as described herein. The software can receive inputs from a user, preferably using an intuitive graphical user interface. The inputs may be for modifying the data structure 100 or for obtaining information from the data structure 100. The software then provides an output, which may be a confirmation that a change was made or the requested information.

Figure 6:
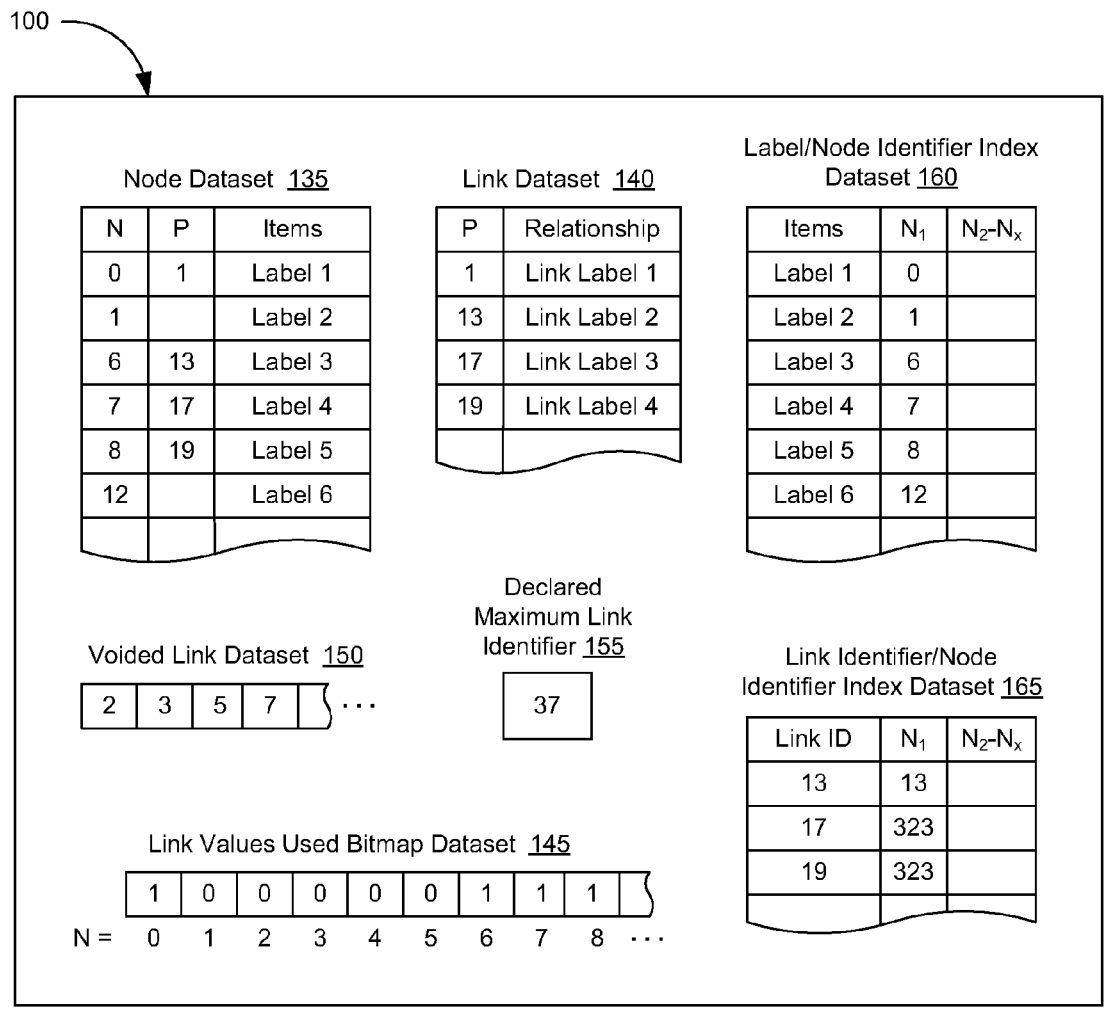
FIG. 6 is a schematic diagram of a data structure, in accordance with an embodiment of the invention.

The data in the data structure 100 may be stored in a number of ways, depending on the implementation and the available system resources. FIG. 6 illustrates the data structure 100 in accordance with one embodiment of the invention; however, various other techniques can be applied to optimize the data structure 100 based on the prime number calculations to be performed by the software modules 110 and 120. In the embodiment shown, the data structure 100 comprises a list 135 of nodes, a list 140 of link identifiers used, a bitmap 145 of used link identifiers, a list 150 of voided link identifiers, and a declared value 155 for the maximum prime number to be used for link identifiers in the system.

The list 135 of information items is used to associate the items that have been mapped to the primenet structure with the particular node identifiers to which they are mapped. This effectively provides a mapping from the real world problem domain into the primenet structure. In the embodiment shown, the list 135 of items stores a label for each item associated with the item's node identifier in the primenet structure; the label can be any type of data, such as text, numerical, graphical, audio/video, etc. In addition, the items in the list 135 may be specified by a pointer, index, or other indirect means instead of associating a label for the each item. This would further reduce the size of the list 135 in memory. The list 135 also contains the link identifier associated with the node if the node has outbound links. Although this value could be calculated from the node identifier, it is stored here to avoid the overhead of calculating each time it is needed.

The data structure 100 also stores a list 140 of the prime numbers associated with node identifiers and a bitmap 145 of the prime numbers used. This list 140 and bitmap 145 are not inherently necessary, since the prime numbers used could be obtained from the list 135 of items, but they may facilitate the algorithms used to process the data structure 100. The list 140 of prime numbers used simply stores an ordered list of each of the prime number identifiers that have been associated with an information item. This list 140 may be used to calculate the Nth prime number more efficiently. The bitmap 145 of prime numbers used is an ordered bitmap that stores a 1 if a particular node is associated with a used prime number link identifier, and a 0 otherwise. This bitmap 145 may be used for a quick identification of whether a particular node in the primenet has an associated information item.

The data structure 100 also contains a list 150 of voided link identifiers, preferably ordered. This allows the algorithms to determine whether a particular link in the primenet has been declared a void. By consulting this list, an algorithm can quickly determine which prime factors of a particular node identifier are voids (and thus do not correspond to an active inbound link) and which are not voids (and thus correspond to an active inbound link).

In one embodiment, the data structure 100 further includes a label/node identifier index 160 for associating the item labels with their one or more associated node identifiers and permitting a direct lookup of the node identifier(s) associated with each label. The index 160 may sort the item labels alphanumerically to allow for rapid lookup of node identifiers from particular item labels. In one embodiment, the index 160 associates each label with a first node identifier and, if the label is common to other node identifiers, further associates the label with additional node identifiers. As illustrated in FIG. 6, the index 160 may associate any particular label with additional identifiers (e.g., $N_2$ to $N_x$) by including a reference or pointer to a linked list.

The label/node identifier index 160 allows translation of queries expressed in terms of the labels to the particular nodes in the underlying primenet representation. Although nodes are unique to an entity in a problem domain, in certain applications of an embodiment of the data structure 100, the same item label may be used for several different entities in the problem domain. For example, there may be multiple instances of "George Smith" in the problem domain. The label/node identifier index 160 thus facilitates the use of multiple node identifiers related to a single label in the data structure 100 so that the system can resolve any ambiguities this causes via interaction with a user. For example, the system may accept an input or query from a user based on a label. The system would then attempt to translate that label to a particular node identifier using this index 160. If the particular entity (identified, e.g., by a unique node identifier) cannot otherwise be determined unambiguously from context or some other information, the system may ask the user which "George Smith" is being referenced.

In another embodiment, a link identifier/node identifier index dataset 165 relates a link identifier to each of the node identifiers to which it points. In this way, the dataset 165 permits direct lookup of a node identifier from a corresponding link identifier. The link identifier/node identifier index dataset 165 can be used as an alternative to searching when it is necessary to determine all the nodes to which a given link identifier points. Since the number of node identifiers pointed to by a link identifier is not predetermined, the dataset 165 may store additional node identifiers after the first in a linked list. The link identifier/node identifier index dataset 165 may be created, for example, using the node dataset 135 with the link identifier as the key field Although the use of the link identifier/node identifier index dataset 165 may greatly speed up the process of finding node identifiers pointed to by one or more link identifiers, it may also add significant maintenance overhead. Because of this maintenance overhead, the use of the dataset 165 may be evaluated on a case-by-case basis in various implementations. For example, it might be used for a static problem domain, but not for a problem domain that is highly volatile.

FIG. 6 is a logical illustration of an embodiment of the data structure 100, and those of skill in the art will understand that the data structure 100 need not be implemented as a monolithic data structure that holds all of this information. In practice, the implementation may be a number of discrete structures that together form the data structure 100. The data structure 100 may thus be stored physically in memory as multiple discontinuous units, and can be loaded into memory during operation as one or more individual entities upon retrieval.

Software Management Modules

As explained above, the primenet data structure allows the complexity of the problem domain to be mapped to the data structure itself, rather than that complexity being coded in the algorithms used to process the data structure. This allows for greatly simplified management modules 110. Some of the possible management modules 110 are described in more detail below; however, it can be appreciated that many other algorithms and techniques can be used to modify a primenet data structure and/or extract information from the primenet data structure, depending on the result that is desired.

One type of management module that may be used with the primenet data structure includes algorithms for modifying the data structure. This type of module may include processes for adding or deleting nodes from the primenet structure or adding or removing links between nodes in the structure. Using these basic tools, any desired data structure can be constructed to map a set of information items in a particular problem domain to the desired portion of the primenet structure. These tools also allow an existing data structure to be modified, for example to add records to the data structure as real-world events in the problem domain change what is being modeled.

In one embodiment, the management modules 110 include a process for adding an information item as a new node, where the added node may be linked as a child node to one or more other parent nodes. Inputs to the process thus include where the information item is to be added—i.e., which nodes are to be the parent nodes of the added node. In one embodiment, the management module 110 adds a new information item to the data structure using the following steps:

1. Accept as an input one or more parent nodes from which the information item being added is to be related.
2. Compute the product of the link identifiers associated with the identified parent nodes.
3. To avoid a conflict with an existing node, check if the resulting product is already in use as a node identifier, using, e.g., the list 135 of assigned node identifiers. If the product is already assigned, multiply that product by each possible combination of one or more voids from the void list 150 until the resulting product is not in use as a node identifier. If no combination of existing voids yields an unused node identifier, a new void is declared and then used to compute the new product. The system may ask for user verification that an item is indeed new and not a duplicate of an existing item.

4. Add the new node using the product obtained above as the new node's node identifier, and associate the new node with the information item being added.

In another embodiment, the management modules 110 include a process for deleting an information item from the data structure. Deleting an information item from the data structure may be performed using the following steps:

1. Accept as an input the information item to be removed.
2. Remove the record corresponding to the node from the data structure.
3. If the node has a link identifier, find all nodes having node identifiers that are multiples of the link identifier. These nodes can be found either by dividing each node identifier by the link identifier to determine if the node identifier is an exact multiple of the link identifier, or by looking up the link identifier in the link identifier/node identifier index dataset 165 to determine all of the nodes that are pointed to by the link.
4. For each node found in step 3, remove the link from the deleted node to the found node, as described below.

As explained herein, information items associated with root nodes are predefined and are not related from any other information items in the data structure. These root nodes are the nodes upon which the other items in the problem domain are defined. In one embodiment, creating a new root node in the data structure comprises the following steps:

1. Select an unused node and obtain its node identifier. An unused node is a node that is not included on the list 135 of assigned node identifiers. If the node is likely to be used to primordinate other nodes, it may be helpful to select a node identifier having a small integer value to avoid the other node identifiers from becoming too large for the computer system's resources.
2. Factor the node identifier to determine its prime factors.
3. Declare each of the prime factors the node identifier to be void, if not already, by adding the prime factors to the void list 150.

In this way, inbound links are not allowed into the axiomatic node, which prevents the information item associated with that node to be linked from other information items in the domain.

In another embodiment, the management modules 110 include a process for adding and removing links from a parent node to a child node, as a basic way to define the relationships among the items in the modeled problem domain. In one embodiment, the management module 110 adds a new link from a parent node to a child node by using the following steps:

1. Obtain the node identity of the parent node.
2. Compute or access the link identity for the parent node.
3. Multiply the node identity of the child node by the link identity of the parent node.
4. To avoid a conflict with an existing node, check if the resulting product is already in use as a node identifier, e.g., using the node list 135. If the product is already assigned, multiply that product by each possible combination of one or more voids from the void list 150 until the resulting product is not in use as a node identifier. If no combination of existing voids yields an unused node identifier, a new void is declared and then used to compute the new product. The system may ask for user verification that an item is indeed unique and not a duplicate of an existing item.
5. Replace the node identity of the child node with the resulting product from above.
6. Propagate the change by searching the data structure for nodes having a prime factor equal to the old link identifier of the child node (i.e., searching for the modified child node's children). In one embodiment, this is performed by searching for multiples of the child node's old link identifier in the node dataset 135. In another embodiment, this is performed by looking up the link identifier in the link identifier/node identifier index dataset 165 to determine all of the nodes that are pointed to by the link.
7. The nodes having node identifiers that are multiples of the child node's old link identifier are the "grandchild" nodes.
8. For each of those grandchild nodes, divide out the old link identifier from node identifier and multiply by the new link identifier of the child node.
9. Repeat steps 6, 7, and 8 recursively for any descendents of the changed node until the effect of the original change is propagated to all of its descendents (i.e., there are no remaining nodes that need to be modified to reflect the effect of the original change).

Conversely, an existing link can be removed. In another embodiment, the management modules 110 include a process for removing a link from a parent node to a child node, which comprises the following steps:

1. Obtain the node identity of the parent node.
2. Compute or access the link identity for the parent node.
3. Divide the node identity of the child node by the link identity of the parent node.
4. To avoid a conflict with an existing node, check if the resulting product is already in use as a node identifier. If the product is already assigned, multiply that product by each possible combination of one or more voids from the void list 150 until the resulting product is not in use as a node identifier. If no combination of existing voids yields an unused node identifier, a new void is declared and then used to compute the new product. The system may ask for user verification that an item is indeed unique and not a duplicate of an existing item.
5. Replace the node identity of the child node with the result from above.
6. Propagate the change by searching the data structure for nodes having a prime factor equal to the old link identifier of the child node (i.e., searching for the modified child node's children). In one embodiment, this is performed by searching for multiples of the child node's old link identifier in the node dataset. In another embodiment, this is performed by looking up the link identifier in the link identifier/node identifier index dataset 165 to determine all of the nodes that are pointed to by the link.
7. The nodes having node identifiers that are multiples of the child node's old link identifier are the "grandchild" nodes.
8. For each of those grandchild nodes, divide out the old link identifier from node identifier and multiply by the new link identifier of child.
9. Repeat steps 6, 7, and 8 recursively for any descendents of the changed node until the effect of the original change is propagated to all of its descendents (i.e., there are no remaining nodes that need to be modified to reflect the effect of the original change).

Another type of management module 110 that may be used with the primenet data structure includes algorithms for extracting information from the data structure. This includes techniques for determining relationships for a particular node, such as parent and child relationships, and additional relationships to other ancestors or descendents in that chain. It may also include determining relationships between two or more particular nodes. These tools allow a user to uncover relationships that are implied by or otherwise contained within the data structure, which models the problem domain.

The data extraction module 110 may include a basic data extraction process to identify all of the children or all of the parents for a particular information item's node. Identifying all of the children of a particular parent node may be used to answer various queries, depending on the meaning of the links between the parent and its children. For example, the query may provide all of the items that are members of a group defined by the parent, all the items that are caused by the parent, and/or all the items that are otherwise related from the parent. In one embodiment, the data extraction module 110 identifies the children of a parent node by using the following steps:
1. Accept as input the parent node for which the children are desired.
2. Compute or access the link identity for the parent node.
3. Find any nodes having a node identifier whose prime factors include the link identity of the parent node. In this step the prime factors that have been declared void are preferably ignored.
4. Output the nodes found as being children of the parent node.

This process can be repeated for each of the identified children to identify the grandchildren, and so on, for as many layers down in the primenet as desired.

Conversely, identifying all of the parents of a particular child node may be used to answer various queries, also depending on the meaning of the links between the parent and its children. For example, the query may provide all of the items that define groups of which the child is a member, all the items that cause the child, and/or all the items that are otherwise related to the child. In one embodiment, identifying the parents of a child node comprises the following steps:
1. Accept as input the child node for which the parents are desired.
2. Compute the prime factors of the node identity of the child node.
3. Find any nodes having a link identifier that matches one of the prime factors of the node identity of the child node. In the node dataset 135, nodes are sorted and indexed by their node identifiers, not their link identifiers. To find parent nodes given a child node, the link identifiers pointing into a child node are translated into a node identifier for a parent node. The link identifier will be the Nth prime, and the node identifier will be N.
4. Output the nodes found as being parents of the child node.

This process can be repeated for each of the identified parent to identify the grandparents, and so on, for as many layers up in the primenet as desired.

Various techniques can be used to translate the link identifiers into node identifiers, as used in the process above. In one embodiment, given the Nth prime P, the process calculates an exact value for N using a technique such as the Sieve of Eratosthenes or any of a number of other techniques for determining an exact value of N. In another embodiment, given the Nth prime P, the process estimates N and then searches the node dataset 135 for nodes that have node identifiers close to the estimate. For each node identifier that is found to be close to the estimate, examine its link identifier for a match. There are a number of equations that can be used to estimate N, e.g., N is approximately equal to P/In(P). Any of the many other methods for estimating N given P can be used to implement this capability. The determination of which technique is most efficient may vary on a case-by-case basis.

An alternative to the techniques for translating the link identifiers into node identifiers described above is to build an index that tabulates the parent nodes for each child node. This index is then used to perform a direct lookup of parent nodes for any child node. While there is nothing to prevent use of the index to supplement a primenet structure, elimination of the need for such indexes under most circumstances is one benefit of embodiments of the primenet structure. Delays in maintaining an index result in false positives and negatives on queries. Attempting to synchronize data redundancies between and within a dataset 135 and its indices greatly increases algorithmic complexity. Eliminating the need for indices in primenet datasets 135 reduces data redundancy and algorithmic complexity while increasing timeliness and accuracy. In one embodiment, the only index used by the primenet structure is one that maps an information item in the problem domain to a node in the primenet structure.

The data extraction module 110 may include a data extraction process to identify the intersection of multiple nodes. This tool identifies the nodes that are primordinated by multiple other nodes. This may be useful, for example, when a user desires to identify information items in the data structure that are members of or otherwise associated with two or more other items. Alternatively, it may be useful to identify any nodes that result from two or more items. In one embodiment, identifying the intersection of multiple nodes comprises the following steps:
1. Determine the link identifiers for two or more nodes for which the intersection of child nodes is desired.
2. Calculate the product of the link identifiers found in step 1.
3. Find any nodes in the primenet dataset 135 having node identities that are multiples of the product calculated in step 2. In one embodiment, this is performed by searching for multiples of the child node's old link identifier in the node dataset 135. In another embodiment, this is performed by looking up the link identifiers in the link identifier/node identifier index dataset 165 to determine the list of the nodes that are pointed to by each of the link identifiers found in step 1 and then taking the intersection of these lists.
4. Output the nodes found as the intersection nodes.

In some applications, a user may wish to define a particular node in terms of the axiomatic root nodes in the data structure. The axiomatic nodes are those that are not defined in terms of any other nodes—essentially, the "truths" in the problem domain that are modeled into the data structure. Understanding a particular node's definition in terms of the axiomatic nodes, therefore, may give a useful context for the node in the overall problem domain. This technique would be useful, for example, in tracing a chain of causality from an effect back to the original cause, showing all intermediate effect and cause relationships between the original cause and final result. In one embodiment, the data extraction module 110 includes a data extraction process to find the backward chain from a particular node to all axiomatic nodes by using the following steps:
1. Obtain the node identity of the selected node.
2. Compute the prime factors of the node identity of the selected node, ignoring any voids.
3. Find any nodes having a link identifier that matches one of the prime factors of the node identity of the selected node. In the node dataset 135, nodes are sorted and indexed by their node identifiers, not their link identifiers. To find parent nodes given a child node, the link identifiers pointing into a child node are translated into a node identifier for a parent node. The link identifier will be the Nth prime and the node identifier will be N.
4. Save the list of nodes found and their links to the selected node.
5. For each node in the saved list, repeat steps 1 through 4 recursively until only axiomatic nodes are found.
6. Output a map of all nodes found along with their interconnecting links.

The primenet structure thus enables the user to calculate accurately the complete ancestry of a node based solely on its node identifier. An alternative is to use indices and/or conventional search techniques. Using a combination of calculations and searching to determine a node's ancestry is a further refinement enabled by the primenet structure.

A user may also wish to understand what nodes follow from a particular node in the data structure. In the problem domain, essentially, this is starting with a premise—the particular information item—and determining what follows from that premise (i.e., "given the node, then what?"). In one embodiment, the data extraction module 110 includes a data extraction process to find the forward chain from a particular node to all of its descendent nodes by using the following steps:
1. Determine the link identifier of the node designated as first node in the chain.
2. Find all nodes having node identifiers that are multiples of the link identifier determined in step 1.
3. Repeat steps 1 and 2 recursively for each node found in step 2 until no more nodes are found that satisfy the condition specified in step 2.
4. Output all nodes found along with their interconnecting links.

Another tool provides the relationship between two particular nodes in the data structure. Given an ancestor node and a descendant node, this tool displays a set of nodes and links that connect the ancestor and descendant nodes. This may be useful to answer the question of what is the relationship between two information items in the modeled problem domain. In one embodiment, determining the relationship between an ancestor node and a descendant node comprises the following steps:
1. Find the backward chain from the descendant node as described above, but stop the backward chaining process when the node corresponding to the ancestor is found in the chain or when all the node identifiers in the chains being traced are less than the node identifier of target ancestor. The latter condition, if true, would indicate that there is no ancestor-descendent relationship between the two nodes.
2. Find the forward chain from the ancestor node, as described above, but stop when the node corresponding to the descendent is found To increase efficiency, the forward chaining process can be limited to the set of nodes found in the backward chain created in step 1.
3. Mark all nodes that appear in both backward and forward chains.
4. Display a map of the ancestor node, descendant node, and all marked nodes, showing any links between each of the displayed nodes.

To model certain aspects of problem domains, such as direct mathematical relationships, the primenet structure may be inadequate or less efficient than using basic algorithms for the same task. For example, it would be possible to store a large number of multiplication problems and their products in a primenet structure, but it is more efficient to use an algorithm to calculate the products as they are needed. Accordingly, a set of helper modules 120 may also be included in the architecture to model aspects of the problem domain that would be inefficient to model using the primenet. The helper modules 120 may be implemented as a set of software tools used in connection with the data structure 100. Preferably, the majority of the problem domain would be contained within the data structure 100, with a limited set of features modeled using the helper modules 120. This avoids the additional algorithmic complexity and the inherent disadvantages associated with adding more algorithms to the architecture.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are the means used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program product stored in the computer. Such a computer program product may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A data management system comprising:
   a data structure comprising:
      a plurality of records, each record associating an information item with a node in the data structure, each node identified by a unique integer node identifier, and
      a set of directed links, each directed link linking a parent node to a child node and identified by a prime number link identifier, wherein for each link the corresponding link identifier is the Nth prime number, where N is the node identifier of the parent node, and the link identifier is a prime factor of the node identifier of the child node, whereby the node identifier for each child node is the product of at least the link identifiers of the directed links from each parent node that is linked to the child node; and
   a computer-readable medium containing computer program code that comprises a plurality of management modules, each management module adapted to perform one or more operations on the data structure.

2. The system of claim 1, wherein at least one of the directed links indicates a membership relationship between the information item associated with the child node and the information item associated with the parent node, where the information item associated with the child node is a member of a set defined by the information item associated with the parent node.

3. The system of claim 1, wherein at least one of the directed links indicates a causation relationship between the information item associated with the child node and the information item associated with the parent node.

4. The system of claim 1, wherein the data structure further comprises one or more voided link identifiers through which a link from a parent node to a child node is disallowed.

5. The system of claim 4, wherein one or more of the records are associated with axiomatic nodes, wherein each axiomatic node has a node identifier for which every prime factor corresponds to a voided link identifier, whereby the axiomatic node has no parent nodes.

6. The system of claim 1, wherein the data structure further comprises a global node having a node identifier of 0, wherein the global node is linked to all other nodes in the data structure.

7. The system of claim 1, wherein the records are stored on a computer-Readable medium as a dataset of information items and corresponding node identifiers, and the links are stored on a computer-readable medium as a dataset of link identifiers.

8. The system of claim 4, wherein the records are stored on a computer-Readable medium as a dataset of information items and corresponding node identifiers, the links are stored on a computer-readable medium as a dataset of link identifiers, and the voided link identifiers are stored on a computer-readable medium as a dataset of voided link identifiers.

9. The system of claim 7, wherein the links are further stored on a computer-readable medium as a bitmap dataset of used link identifiers.

10. The system of claim 1, wherein the management modules include a first set of modules adapted to modify the data structure and a second set of modules adapted to obtain information from the data structure in response to a query.

11. The system of claim 1, wherein the management modules include a module for adding a record to the data structure.

12. The system of claim 11, wherein the management module for adding a record to the data structure is adapted to associate the record to be added with a node having an unused node identifier.

13. The system of claim 1, wherein the management modules include a module for deleting a record from the data structure.

14. The system of claim 1, wherein the management modules include a module for adding a directed link from a first node to a second node in the data structure.

15. The system of claim 14, wherein the management module for adding a directed link is adapted to add the directed link by multiplying the node identifier of the second node by the link identifier of the first node.

16. The system of claim 15, wherein the management module for adding a directed link is farther adapted to propagate the change for any nodes directly or indirectly linked to from the second node to maintain the other directed links in the data structure.

17. The system of claim 1, wherein the management modules include a module for removing a directed link from a first node to a second node in the data structure.

18. The system of claim 17, wherein the management module for removing a directed link is adapted to remove the directed link by dividing the node identifier of the second node by the link identifier of the first node.

19. The system of claim 1, wherein the management modules include a module for identifying all child nodes of a parent node.

20. The system of claim 1, wherein the management modules include a module for identifying all parent nodes of a child node.

21. The system of claim 20, wherein the management module for identifying all parent nodes of a child node is adapted to determine the link identifiers for each parent node by factoring the node identifier of the child node, and then translate the link identifiers of the parent nodes into corresponding node identifiers of the parent nodes.

22. The system of claim 21, wherein the link identifiers of the parent nodes are translated into corresponding node identifiers using a mathematical calculation.

23. The system of claim 21, wherein the link identifiers of the parent nodes are translated into corresponding node identifiers using a search assisted by a mathematical calculation.

24. The system of claim 1, wherein the management modules include a module for identifying an intersection of the child nodes for a plurality of parent nodes.

25. The system of claim 24, wherein the management module for identifying the intersection is adapted to determine a product of the link identifiers associated with the parent nodes and identify the intersection as any nodes having a node identifier that is a multiple of the product.

26. The system of claim 1, wherein the management modules include a module for determining a backward chain from a selected node, where the backward chain includes the nodes that link into the selected node and, recursively, any nodes that link into a node in the backward chain.

27. The system of claim 1, wherein the management modules include a module for determining a forward chain from a selected node, where the forward chain includes the nodes that link from the selected node and, recursively, any nodes that link from a node in the forward chain.

28. The system of claim 1, wherein the management modules include a module for determining a relationship from an ancestor node to a descendant node.

29. The system of claim 28, wherein the management module for determining a relationship from an ancestor node to a descendant node is adapted to determine a backward chain from the descendant node, where the backward chain includes the nodes that link into the descendant node and, recursively, any nodes that link into a node in the backward chain, and further adapted to determine a forward chain from the ancestor node, where the forward chain includes the nodes that link from the ancestor node and, recursively, any nodes that link from a node in the forward chain, wherein the relationship between the ancestor node and the descendant node is a map that includes any nodes that are in both the backward and forward chains.

30. A computer program product for managing a plurality of information items in a problem domain, the computer program product comprising a computer-readable medium containing computer program code comprising:

a data structure comprising a plurality of nodes, each node associated with an integer node identifier and an information item, where each node having a node identifier N is a parent of any children nodes that have a node identifier of which the Nth prime number is a factor, and where each child node has a node identifier that is the product of at least the Nth prime numbers where N is the node identifier of each of the parent nodes of the child node;

a plurality of records, each record associated with an information item and a node in the data structure; and a plurality of management modules, each management module adapted to perform one or more functions on the data structure.

31. The computer program product of claim 30, wherein the functions performed by one or more of the management modules include:

a step for adding a record to the data structure; and a step for deleting a record from the data structure.

32. The computer program product of claim 30, wherein the functions performed by one or more of the management modules include:

a step for adding a directed link from a first node to a second node in the data structure; and a step for removing a directed link from a first node to a second node in the data structure.

33. The computer program product of claim 30, wherein the functions performed by one or more of the management modules include:

a step for identifying all child nodes of a parent node; and a step for identifying all parent nodes of a child node.

34. The computer program product of claim 30, wherein the functions performed by one or more of the management modules include:

a step for identifying an intersection of the child nodes for a plurality of parent nodes.

35. The computer program product of claim 30, wherein the functions performed by one or more of the management modules include:

a step for determining a backward chain from a selected node, where the backward chain includes the nodes that link into the selected node and, recursively, any nodes that link into a node in the backward chain; and a step for determining a forward chain from a selected node, where the forward chain includes the nodes that link from the selected node and, recursively, any nodes that link from a node in the forward chain.

36. The computer program product of claim 30, wherein the functions performed by one or more of the management modules include:

a step for determining a relationship from an ancestor node to a descendant node.

37. A computer program product for modeling a problem domain using a plurality of information items associated by directed links, the computer program product comprising a computer-readable medium containing computer program code for performing the method comprising:

assigning each of the plurality of information items to a node identified by a unique integer node identifier;

directedly linking pairs of nodes, where each resulting directed link from a parent node to a child node is associated with a prime number link identifier, wherein for each child node identifier is the product of at least the link identifiers of the directed links from each parent node that is linked to the child node, and wherein for each link:

the corresponding link identifier is the Nth prime number, where N is the node identifier of the parent node, and the link identifier is a prime factor of the node identifier of the child node; and declaring one or more link identifiers to be void, where a link from a parent node to a child node is disallowed if its link identifier is void.

38. The computer program product of claim 37, wherein at least one of the directed links indicates that the information item associated with the child node is a member of a set in the problem domain defined by the information item associated with the parent node.

39. The computer program product of claim 37, wherein at least one of the directed links indicates causation in the problem domain between the information item associated with the child node and the information item associated with the parent node.

40. The computer program product of claim 37, wherein the computer-readable medium further contains computer program code for:

defining one or more axiomatic nodes by declaring to be void each link identifier that corresponds to a prime factor of every axiomatic node to be defined.

41. A computer implemented method for modeling a problem domain using a plurality of information items associated by directed links, the method comprising:

assigning each of the plurality of information items to a node identified by a unique integer node identifier;

directedly linking pairs of nodes, where each resulting directed link from a parent node to a child node is associated with a prime number link identifier, wherein for each child node the node identifier is the product of at least the link identifiers of the directed links from each parent node that is linked to the child node, and wherein for each link:

the corresponding link identifier is the Nth prime number, where N is the node identifier of the parent node, and the link identifier is a prime factor of the node identifier of the child node; and declaring one or more link identifiers to be void, where a link from a parent node to a child node is disallowed if its link identifier is void.

42. The method of claim 41, wherein at least one of the directed links indicates that the information item associated with the child node is a member of a set in the problem domain defined by the information item associated with the parent node.

43. The method of claim 41, wherein at least one of the directed links indicates causation in the problem domain between the information item associated with the child node and the information item associated with the parent node.

44. The method of claim 41, further comprising:

defining one or more axiomatic nodes by declaring to be void each link identifier that corresponds to a prime factor of every axiomatic node to be defined.

* * * * *

UNITED STATES PATENT AND TRADEMARK OFFICE
CERTIFICATE OF CORRECTION

PATENT NO. : 7,606,817 B2  Page 1 of 1
APPLICATION NO. : 11/461981
DATED : October 20, 2009
INVENTOR(S) : Joe Carter It is certified that error appears in the above-identified patent and that said Letters Patent is hereby corrected as shown below:

In the claims

Column 18, line 59, Claim 16, "farther" should be "further".
Column 20, line 54, Claim 37, after "child node" insert --the node--.

Signed and Sealed this
Seventh Day of July, 2015

Michelle K. Lee
*Director of the United States Patent and Trademark Office*